United States Patent
Moulsley et al.

(10) Patent No.: US 7,554,943 B2
(45) Date of Patent: Jun. 30, 2009

(54) RADIO COMMUNICATION SYSTEM

(75) Inventors: Timothy James Moulsley, Caterham (GB); Matthew Peter John Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 682 days.

(21) Appl. No.: 10/503,429

(22) PCT Filed: Jan. 27, 2003

(86) PCT No.: PCT/IB03/00225

§ 371 (c)(1),
(2), (4) Date: Aug. 3, 2004

(87) PCT Pub. No.: WO03/067915

PCT Pub. Date: Aug. 14, 2003

(65) Prior Publication Data

US 2005/0083977 A1    Apr. 21, 2005

(30) Foreign Application Priority Data

Feb. 8, 2002  (GB) ............................ 0202991.6
Feb. 12, 2002 (GB) ............................ 0203263.9

(51) Int. Cl.
*H04W 4/00* (2006.01)
(52) U.S. Cl. .......................... 370/329; 370/343
(58) Field of Classification Search ................ 370/329, 370/330, 243, 343, 341, 468, 503
See application file for complete search history.

(56) References Cited

U.S. PATENT DOCUMENTS

| | | | |
|---|---|---|---|
| 2,292,387 A * | 8/1942 | Markey et al. ............... | 380/34 |
| 5,117,501 A * | 5/1992 | Childress et al. ............ | 455/11.1 |
| 5,381,443 A | 1/1995 | Borth et al. | |
| 5,469,469 A * | 11/1995 | Haines ..................... | 375/131 |
| 5,506,863 A | 4/1996 | Meidan et al. | |
| 5,625,878 A * | 4/1997 | Lopponen et al. ........... | 455/509 |
| 5,732,353 A * | 3/1998 | Haartsen .................... | 455/450 |
| 5,870,391 A * | 2/1999 | Nago ........................ | 370/330 |
| 5,875,202 A * | 2/1999 | Venters et al. ............. | 714/807 |
| 5,940,380 A * | 8/1999 | Poon et al. ................. | 370/330 |
| 6,901,065 B1 * | 5/2005 | Ehrstedt et al. ............ | 370/341 |

(Continued)

FOREIGN PATENT DOCUMENTS

EP    0650304 A2    4/1995

(Continued)

*Primary Examiner*—Kwang B Yao
*Assistant Examiner*—Andrew Lai

(57) ABSTRACT

In a radio communication system having a data channel for the transmission of data packets from a primary station to a secondary station, a plurality of downlink control channels are used to signal information relating to packet transmission. A problem with this scheme is that with a fixed control channel allocation system throughput (T) for a given offered load (O) can be significantly reduced in a worst case scenario (for example two secondary stations using the same control channel). One solution uses an indicator signal to inform a secondary station of the control channel it should receive, but this adds significant complexity to the system. The present invention provides a simpler scheme having similar benefits by shuffling the allocation of control channels to secondary stations, according to a defined sequence for each secondary station, thereby avoiding the worst case scenario.

17 Claims, 1 Drawing Sheet

U.S. PATENT DOCUMENTS

2002/0010615 A1* 1/2002 Jacobs ........................... 705/9
2002/0150125 A1* 10/2002 Nago ........................ 370/503

FOREIGN PATENT DOCUMENTS

| GB | 2301749 A | 12/1996 |
| JP | 05-114883 A | 5/1993 |
| JP | 11-355860 A | 12/1999 |

* cited by examiner

US 7,554,943 B2

RADIO COMMUNICATION SYSTEM

TECHNICAL FIELD

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

BACKGROUND ART

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

A particular problem with the design of the HSDPA scheme is the mechanism for informing a MS of the presence of a data packet for it to receive and providing information relating to the packet (typically including details of the particular transmission scheme employed, for example spreading code, modulation scheme and coding scheme). As currently proposed, this information is signalled on one of four available downlink control channels, distinguished by their spreading codes. The MS is instructed to decode one of the control channels by a two-bit indicator signal which is transmitted on a low data rate dedicated downlink channel (the signal being inserted by puncturing). The MS then monitors the same control channel for subsequent packets in a burst.

This scheme conveniently supports the scheduling of up to four packets to different MSs in the same time interval. Use of the indicator signal is intended to reduce the complexity of the MS and its power consumption, as the MS only needs to monitor the dedicated downlink channel for the indicator signal instead of having to receive continuously all four control channels. However, there are significant drawbacks with the use of the indicator signal. One drawback is that an additional slot format is required for the dedicated downlink channel (to accommodate the extra signal), which adds complexity. Another drawback is that the transmission power required for the indicator signal can be relatively high to ensure reliable reception of the signal even at the edge of a cell.

One solution which avoids the use of an indicator signal is for each MS to be allocated one of the four control channels, which it then continuously monitors. However, if more than one MS is allocated the same control channel the flexibility of packet scheduling is restricted. Another solution is the provision of one control channel for each MS; however, the potentially large number of channels required could use up excessive system resources.

DISCLOSURE OF INVENTION

An object of the present invention is to provide an improved arrangement which does not require an indicator signal or provision of a large number of control channels.

According to a first aspect of the present invention there is provided a radio communication system having a data channel for the transmission of data packets from a primary station to a secondary station and a plurality of control channels for signalling of control information relating to the data packets from the primary station to the secondary station, wherein the primary station comprises means for allocating one of the control channels to the secondary station and means for changing the allocated control channel according to a defined sequence, and the secondary station comprises means for monitoring the currently allocated control channel to determine information about packet transmissions.

By changing the control channel allocation, system performance is greatly enhanced under worst-case conditions without the need for an indicator signal, which introduces significant extra complexity. The defined sequence may repeat regularly, for example once per frame, and may use as a timing reference a common downlink channel, for example a synchronisation channel in UMTS.

When control channels are allocated to a plurality of secondary stations, their respective defined sequences are preferably all different (provided the number of secondary stations is not too great), and some (but not necessarily all) of the sequences may include only a single control channel.

According to a second aspect of the present invention there is provided a primary station for use in a radio communication system having a data channel for the transmission of data packets from the primary station to a secondary station and a plurality of control channels for signalling of control information relating to the data packets from the primary station to the secondary station, wherein means are provided for allocating one of the control channels to the secondary station and for changing the allocated control channel according to a defined sequence.

According to a third aspect of the present invention there is provided a secondary station for use in a radio communication system having a data channel for the transmission of data packets from a primary station to the secondary station and a plurality of control channels for signalling of control information relating to the data packets from the primary station to the secondary station, wherein means are provided for determining which of the control channels is allocated to the secondary station, the allocated control channel being changed according to a defined sequence, and for monitoring the currently allocated control channel to determine information about packet transmissions.

According to a fourth aspect of the present invention there is provided a method of operating a radio communication system having a data channel for the transmission of data packets from a primary station to a secondary station and a plurality of control channels for signalling of control information relating to the data packets from the primary station to the secondary station, the method comprising the primary station allocating one of the control channels to the secondary station and changing the allocated control channel according to a defined sequence, and the secondary station monitoring the currently allocated control channel to determine information about packet transmissions.

BRIEF DESCRIPTION OF DRAWINGS

Embodiments of the present invention will now be described, by way of example, with reference to the accompanying drawings, wherein.

MODES FOR CARRYING OUT THE INVENTION

Figure 1:
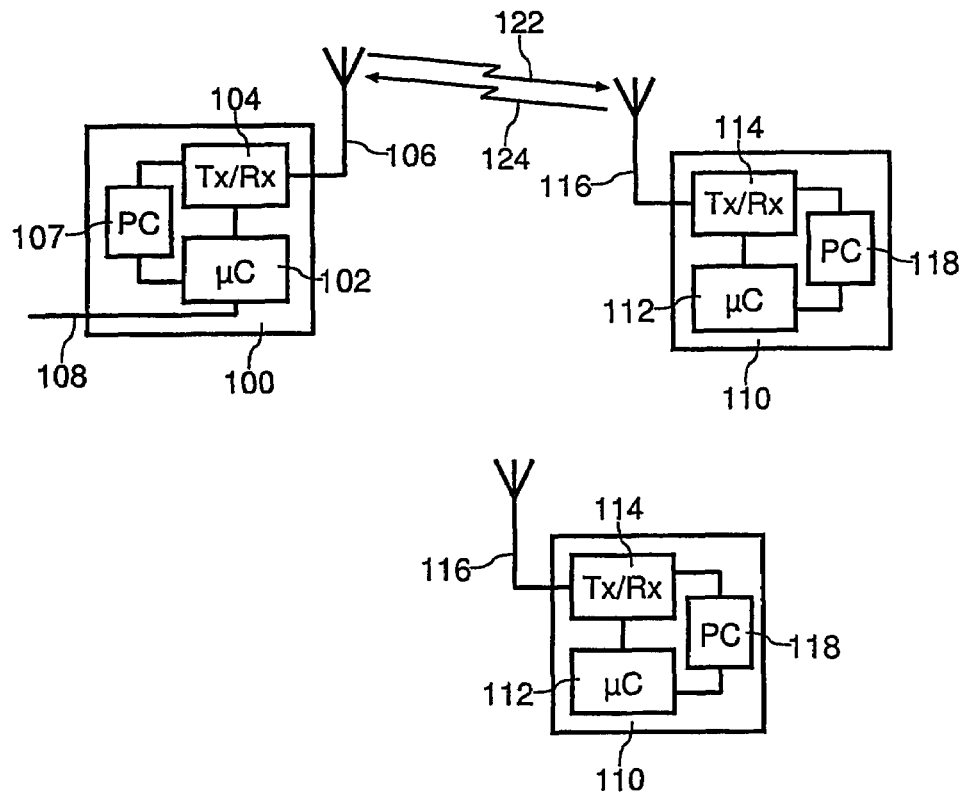
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

The general characteristics of the UMTS HSDPA were outlined above and are summarised here for clarity:

- There are (low data rate) dedicated uplink 124 and downlink 122 channels between a BS 100 and each MS 110 in its cell.
- A specific downlink channel 122 is used for high-speed transmission of data packets. This channel is subdivided into Transmission Time Intervals (TTIs), where each TTI is the time taken for transmission of a data packet. In UMTS the duration of a TTI is 2 ms, and this time period is also identified as a sub-frame (there being three time slots in a sub-frame, and hence 5 time slots in a 10 ms frame).
- Up to four downlink control channels are provided, distinguished by their spreading codes and each relating to transmission parameters of a data packet. Hence, up to four data packets can be transmitted simultaneously per TTI.
- The requirement for being able to schedule four data packets to different stations 110 in the same TTI is to allow high system throughput to be achieved in a cell in which some stations 110 do not have the ability to receive all of the HSDPA downlink resource. For example, some stations 110 may be able to receive only 5 spreading codes when there are up to 15 available.
- A mechanism is provided for indicating to a particular MS 110 that it is scheduled to receive a data packet and for indicating which control channel it should listen to in order to determine how to receive the packet.

As described above, one possible mechanism is the transmission of an indicator signal on the dedicated downlink channel 122 to inform a MS 110 of the transmission of a data packet. However, this mechanism has a number of problems.

As an alternative each MS 110 could be allocated one of the control channels to monitor, thereby avoiding the need for an indicator signal. However, if more than one MS 110 is allocated to a particular control channel the flexibility of packet scheduling is restricted. For example, consider two mobile stations 110, each with data to be sent but both allocated the same control channel. It would generally be desirable to send data simultaneously to both stations 110. However as both stations are sharing a control channel, only one packet can be sent at a time. Given that packet transmission is often bursty in nature, this situation is likely to continue for several TTIs and the system throughput could be only 50% of the maximum. Greater scheduling flexibility could be introduced by requiring each MS 110 to monitor two control channels, but at the cost of increased MS power consumption.

In a system made in accordance with the present invention, this problem is addressed by shuffling the allocation of control channels from one TTI to the next. Hence, if two stations 110 share a control channel in one TTI they will have different ones in the next TTI. If such a scheme is applied to the example above of two active stations 110, then a well-designed shuffling scheme should be able to reduce the probability of an "allocation collision" to $1/N_{con}$, where $N_{con}$ is the total number of control channels (four in the above examples). The maximum loss in throughput would then be $0.5/N_{con}$, or 12.5% with $N_{con}=4$ (compared to 50% without shuffling).

Some examples of how shuffling may be done will now be presented, although the schemes themselves are not necessarily optimal.

First consider the case of two control channels and four stations 110. The allocation of control channels to each station (0 to 3) for each TTI (0 to 4) in a 10 ms frame is:

|         | TTI |   |   |   |   |
|---------|-----|---|---|---|---|
| station | 0   | 1 | 2 | 3 | 4 |
| 0       | 0   | 0 | 0 | 0 | 0 |
| 1       | 1   | 1 | 1 | 1 | 1 |
| 2       | 0   | 1 | 0 | 1 | 0 |
| 3       | 1   | 0 | 1 | 0 | 1 |

This scheme could either repeat in the next frame or be made into a longer cycle.

Next, consider an extension of the above scheme to the case of two control channels and six stations 110:

|         | TTI |   |   |   |   |
|---------|-----|---|---|---|---|
| station | 0   | 1 | 2 | 3 | 4 |
| 0       | 0   | 0 | 0 | 0 | 0 |
| 1       | 1   | 1 | 1 | 1 | 1 |
| 2       | 0   | 1 | 0 | 1 | 0 |
| 3       | 1   | 0 | 1 | 0 | 1 |
| 4       | 0   | 0 | 1 | 1 | 0 |
| 5       | 1   | 1 | 0 | 0 | 1 |

As a third example, consider a system with four control channels and twelve stations 110:

|         | TTI |   |   |   |   |
|---------|-----|---|---|---|---|
| station | 0   | 1 | 2 | 3 | 4 |
| 0       | 0   | 0 | 0 | 0 | 0 |
| 1       | 1   | 1 | 1 | 1 | 1 |
| 2       | 2   | 2 | 2 | 2 | 2 |
| 3       | 3   | 3 | 3 | 3 | 3 |
| 4       | 0   | 1 | 2 | 3 | 0 |
| 5       | 1   | 2 | 3 | 0 | 1 |
| 6       | 2   | 3 | 0 | 1 | 2 |
| 7       | 3   | 0 | 1 | 2 | 3 |
| 8       | 0   | 3 | 2 | 1 | 0 |
| 9       | 1   | 0 | 3 | 2 | 1 |
| 10      | 2   | 1 | 0 | 3 | 2 |
| 11      | 3   | 2 | 1 | 0 | 3 |

It may not be required to have a unique shuffling pattern for each MS 110. In this case it seems preferable to take the station number as a shuffling pattern identifier, and to assign stations 110 to each pattern in ascending sequence. Hence, for small numbers of stations 110 all (or most) of them will have a constant control channel allocation. Although convenient, it is clearly not a requirement of the present invention that any of the shuffling patterns relate to a constant control channel allocation.

The shuffling pattern of the third example can be represented as $$n_{CCH} = [(a \times n_{TTI}) + b] \bmod N_{CCH}$$

where: $n_{CCH}$ is the number of the control channel to be used; $N_{CCH}$ is the total number of control channels available; $n_{TTI}$ is the number of the TTI in the frame; a is a parameter taking values 0, 1 or 3; and b is a parameter taking values 0, 1, 2 or 3.

Simulations of worst-case system throughput were performed using the shuffling pattern of the third example. The following are the main assumptions made for the detailed specification of the simulated system:

Hexagonal 19-cell layout, with a representative segment of the central cell considered for the throughput estimate.
Number of stations 110 (per cell)=12
Static TTI=3 slots (2 ms)
Propagation exponent=3.76
Single path Rayleigh fast fading model (flat spectrum)
Channel conditions stationary during a TTI
MS speed 3 km/h
Standard deviation of log-normal shadowing=8 dB
Shadowing correlation between sites=0.5
30% of BS power allocated to common channels etc in all cells
70% of BS power allocated to HSDPA in all interfering cells
70% of BS power available to HSDPA in wanted cell
Overheads due to dedicated channels associated with HSDPA not considered
10 spreading codes available for HSDPA
MS capability: 5 spreading codes
Spreading factor=16
Available Modulation and Coding Schemes (MCS):
1. QPSK 1/4 rate
2. QPSK 1/2 rate
3. QPSK 3/4 rate
4. 16-QAM 1/2 rate
5. 16-QAM 3/4 rate
Equal transmission power per code
Frame error rate computed from Signal to Interference Ratio (SIR) and block code performance bounds.

To represent streaming services it is assumed that the offered load is comprised of one constant rate data stream per MS 110. For simplicity equal bit rates are also assumed for each data stream. The data for each user is assumed to arrive at a queue in the BS 100, and the queue is updated every TTI. It is assumed that one CRC (Cyclic Redundancy Check) is attached per packet.

As a default, Chase combining of re-transmissions is assumed. An erroneous packet is re-transmitted with the same MCS. Perfect maximum ratio combining is assumed, and the final SIR is computed as the sum of the SIRs of the two packets to be combined.

The simulated scheduler is novel, and is intended to maximise system throughputs. This is done by giving priority to the users which can send the largest packets. For the case of a fixed transmission time this is equivalent to scheduling according to the maximum bit rate that can be provided to each user. The packet size which can be sent is determined mainly by the CIR (Carrier to Interference Ratio). This determines the probability of successful transmission which will be obtained with any given modulation and coding scheme. For each possible scheme an effective packet size can be calculated as $P_{size} = N_{code} \times P_{bits}(1 - BLER)$, where $N_{code}$ is the number of channelisation codes which can be used, $P_{bits}$ is the number of bits transmitted per channelisation code, and BLER is the estimated block error rate for the given transmission scheme. $N_{code}$ is most likely to be determined by the capability of of the MS 110 to receive a given number of channelisation codes simultaneously, but it could be limited by the number of codes allocated by the system. There will also be an upper bound on $N_{code} \times P_{bits}$ due to the amount of data in the queue waiting to be sent to that MS.

A viable approach is to calculate the maximum value of $P_{size}$ for each MS 110 at each TTI (sub-frame). Then sort this into a list in order of decreasing $P_{size}$, then schedule transmission of packets to each MS starting at the front of the list and working down it until all the available downlink resource is assigned. Further variations are possible in which the power assigned to each packet might be adjusted to optimise performance.

Such a scheduler has the aim of maximising total throughput for those stations 110 which have been granted access to HSDPA.

Other general assumptions are that:
A data packet for any user can be allocated to any channelisation code.
More than one channelisation code can be allocated to one user.
The code block size is equal to the amount of data that can be sent with one channelisation code, which means that a "packet" may comprise multiple code blocks sent in parallel within one TTI.
Re-transmissions and first transmissions to the same user are not allowed within the same TTI.
The modulation, coding scheme and power level for first transmissions are chosen to maximise throughput.
All re-transmissions are scheduled before first transmissions, thus giving them a higher priority, and no first transmissions are allowed to a MS 110 while any re-transmissions remain to be sent.
The modulation and coding scheme of a re-transmission is the same as for the first transmission.

Figure 2:
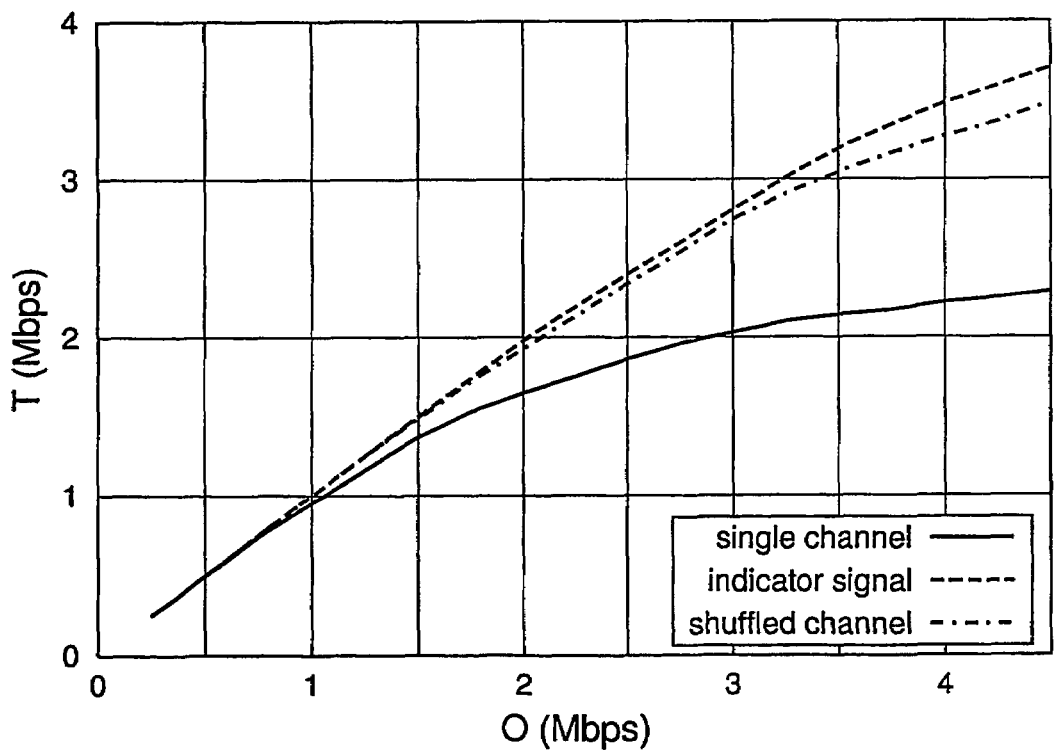
FIG. 2 is a graph of worst-case system throughput T in millions of bits per second (Mbps) against offered load O in Mbps for various control channel schemes.

The results of the simulation are shown in FIG. 2, as a graph of system throughput T in millions of bits per second (Mbps) against offered load O in Mbps. Results are shown for three control channel schemes. In the first, shown as a solid line, each MS 110 is allocated a single control channel (and all stations 110 are allocated the same control channel for this worst-case scenario). In the second, shown as a dashed line, an indicator signal is used to inform a MS 110 of which control channel to monitor, hence each MS 110 is effectively monitoring all four channels. In the third, shown as a chain-dashed line, a shuffling control channel allocation is used as shown for the third example above.

The results clearly show that the first scheme can result in significantly degraded performance under worst-case conditions, while the second and third schemes have comparable performance. Although the use of an indicator signal provides the best results, the results from use of a shuffling control allocation scheme are not significantly worse while, as discussed above, providing significant simplifications to system implementation.

In embodiments of the present invention, a range of modifications to the schemes described above are possible. The BS 100 could agree a shuffling pattern with each MS 110. Then if a MS 110 correctly decodes the control channel for the current TTI, the principle (currently employed in HSDPA) that it decodes the same control channel in the next TTI should be interpreted to mean that in the next TTI the MS 110 decodes the control channel indicated by its assigned shuffling pattern (which may or may not be the same as that for the current TTI).

The time duration of the control channel allocation cycle need not be one frame but could be any convenient length. The timing reference for the shuffling sequence could be a common downlink channel such as a synchronisation channel.

The protocol could be modified so that if a MS 110 detects a control channel transmission but the CRC fails, the MS 110 sends a NACK (negative acknowledgement), which could be different from that sent when the CRC for a data packet fails. This would reduce the power requirements for control channel transmission, since a higher error rate could then be tolerated. This would give the BS 100 some flexibility in choosing the control channel power, but it might restrict the use of non-self-decodable redundancy versions for the re-transmission of data packets (where the original data cannot be deduced from the re-transmission alone).

The transmission of control channels could be restricted in time to one out of every N TTIs (at least for the first packet of a group). This would allow the MS 110 to save some power by not continuously decoding a control channel. The first allocated TTI could be a MS-specific parameter. The restriction could be relaxed when data transmission starts (e.g. when the BS 100 has received an ACK (acknowledgement) for the first packet in a sequence of packets). This event could set a timer. When the timer expires the situation could revert to use of every $N^{th}$ TTI. A range of sequences other than one in every N TTIs could also be used.

There is an alternative method for resolving the scheduling problem where more than one MS 110 needs to be sent data at the same time, but they have been allocated the same control channel. The format of the control channel is modified to contain an indication that a different physical layer message is intended for the MS 110. In a UMTS embodiment this is preferably as an alternative (rather than an addition) to the information on the format of a data packet to be sent on the downlink data channel. This indication could a single bit flag. The physical layer message in this case would be an instruction to change one or more of the control channel(s) which the MS 110 should monitor, from a among a pre-defined set. In a UMTS embodiment the existing ACK/NACK signalling (currently intended to relate to data on the downlink data channel) could be used to indicate whether the physical layer message was received correctly by the MS 110. Alternatively different codewords could be used in the ACK/NACK field for this purpose. Some of the existing control channel structure could be used (for example data fields identifying the intended recipient, or CRCs for error detection). Other physical layer messages might be conveyed in the same way, as an alternative to using the control channel to describe the format of a packet on the data channel. This may require a multi-bit indication/flag of message type. Preferably substantially the same format would be used on control channel, irrespective of the message contents.

A further alternative is to add a data field to the control channel so that a message to change the control channel allocation can be sent at the same time as a data packet. This avoids loss of data transmission capacity in the downlink. Such a message could indicate that, starting with a future TTI, the control channel should change. In this case it would be desirable to limit the size of the message needed (e.g. to one or two bits). Therefore the change could be to a new channel from a small set of available channels or to a new channel which is the next one in a defined sequence.

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

As well as its application in a FDD (Frequency Division Duplex) system as described above, the present invention could be applied in other types of communication system. For example, it could be used in a Time Division Duplex (TDD) system with the modification that the physical channels used may also be distinguished by their use of different time slots or other defined time interval.

The invention claimed is:

1. A radio communication system having a data channel for the transmission of data packets from a primary station to a secondary station and a plurality of control channels for signaling of control information relating to the data packets from the primary station to the secondary station, wherein the primary station comprises means for allocating one of the control channels to the secondary station and means for changing the allocated control channel according to a defined sequence known to both the primary station and the secondary station, and the secondary station comprises means for monitoring the currently allocated control channel to determine information about packet transmissions, wherein the defined sequence is configured to reduce probability of an allocation collision to 1/N, where N is a total number of the control channels.

2. The system as claimed in claim 1, wherein means are provided for regularly repeating the defined sequence.

3. The system as claimed in claim 2, wherein the radio channels are divided into time frames and in that means are provided for repeating the defined sequence once per frame.

4. The system as claimed in claim 1, wherein a timing reference for repetition of the defined sequence is provided by a common downlink channel.

5. The radio communication system of claim 1, wherein a number of the secondary station is a shuffling pattern identifier, and the secondary station is assigned to a pattern of the defined sequence in an ascending sequence of numbers of secondary stations.

6. The radio communication system of claim 1, wherein an erroneous packet is re-transmitted before transmission of a new packet.

7. A primary station for use in a radio communication system having a data channel for the transmission of data packets from the primary station to a secondary station and a plurality of control channels for signaling of control information relating to the data packets from the primary station to the secondary station, wherein means are provided for allocating one of the control channels to the secondary station and for changing the allocated control channel according to a defined sequence known to both the primary station and the secondary station, wherein the defined sequence is configured to reduce probability of an allocation collision to 1/N, where N is a total number of the control channels.

8. The primary station as claimed in claim 7, further comprising means for scheduling data packets for a plurality of secondary stations by giving priority to the largest data packets.

9. The primary station as claimed in claim 7, further comprising means for allocating control channels for a plurality of secondary stations according to a plurality of respective defined sequences, all of which are different.

10. The primary station as claimed in claim 9, wherein not all of the defined sequences include more than one control channel.

11. The primary station as claimed in claim 7, further comprising means for transmitting at least one of the control channels for only a proportion of the time that data packets are transmitted.

12. A secondary station for use in a radio communication system having a data channel for the transmission of data packets from a primary station to the secondary station and a plurality of control channels for signaling of control information relating to the data packets from the primary station to the secondary station, wherein means are provided for determining which of the control channels is allocated to the secondary station, the allocated control channel being changed according to a defined sequence known to both the primary station and the secondary station, and for monitoring the currently allocated control channel to determine information about packet transmissions, wherein the defined sequence is configured to reduce probability of an allocation collision to 1/N, where N is a total number of the control channels.

13. The secondary station as claimed in claim 12, further comprising means for transmitting a negative acknowledgement to the primary station to indicate that the allocated control channel is successfully detected but cannot be correctly received.

14. The secondary station as claimed in claim 13, wherein the negative acknowledgement is a different signal from that used to indicate that a data packet could not be correctly received.

15. A method of operating a radio communication system having a data channel for the transmission of data packets from a primary station to a secondary station and a plurality of control channels for signaling of control information relating to the data packets from the primary station to the secondary station, the method comprising acts of:

allocating by the primary station one of the control channels to the secondary station;

changing the allocated control channel according to a defined sequence known to both the primary station and the secondary station; and monitoring by the secondary station the currently allocated control channel to determine information about packet transmissions, wherein the defined sequence is configured to reduce probability of an allocation collision to 1/N, where N is a total number of the control channels.

16. The method of claim 15, further comprising the act of assigning the secondary station to a pattern of the defined sequence in an ascending sequence of numbers of secondary stations, wherein a number of the secondary station is a shuffling pattern identifier.

17. The method of claim 15, further comprising the act re-transmitting an erroneous packet before transmission of a new packet.

* * * * *